United States Patent Office 2,792,907
Patented May 21, 1957

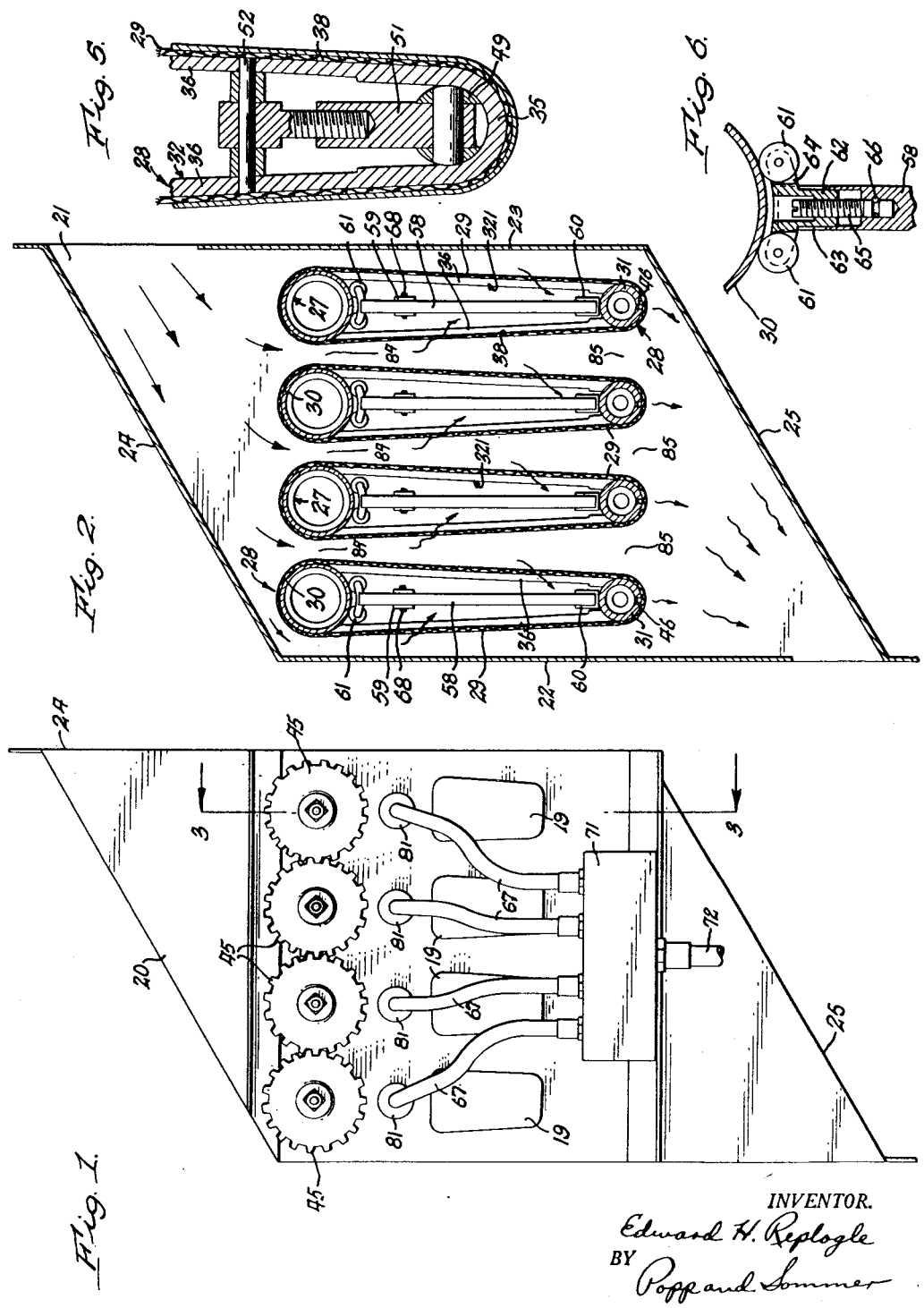

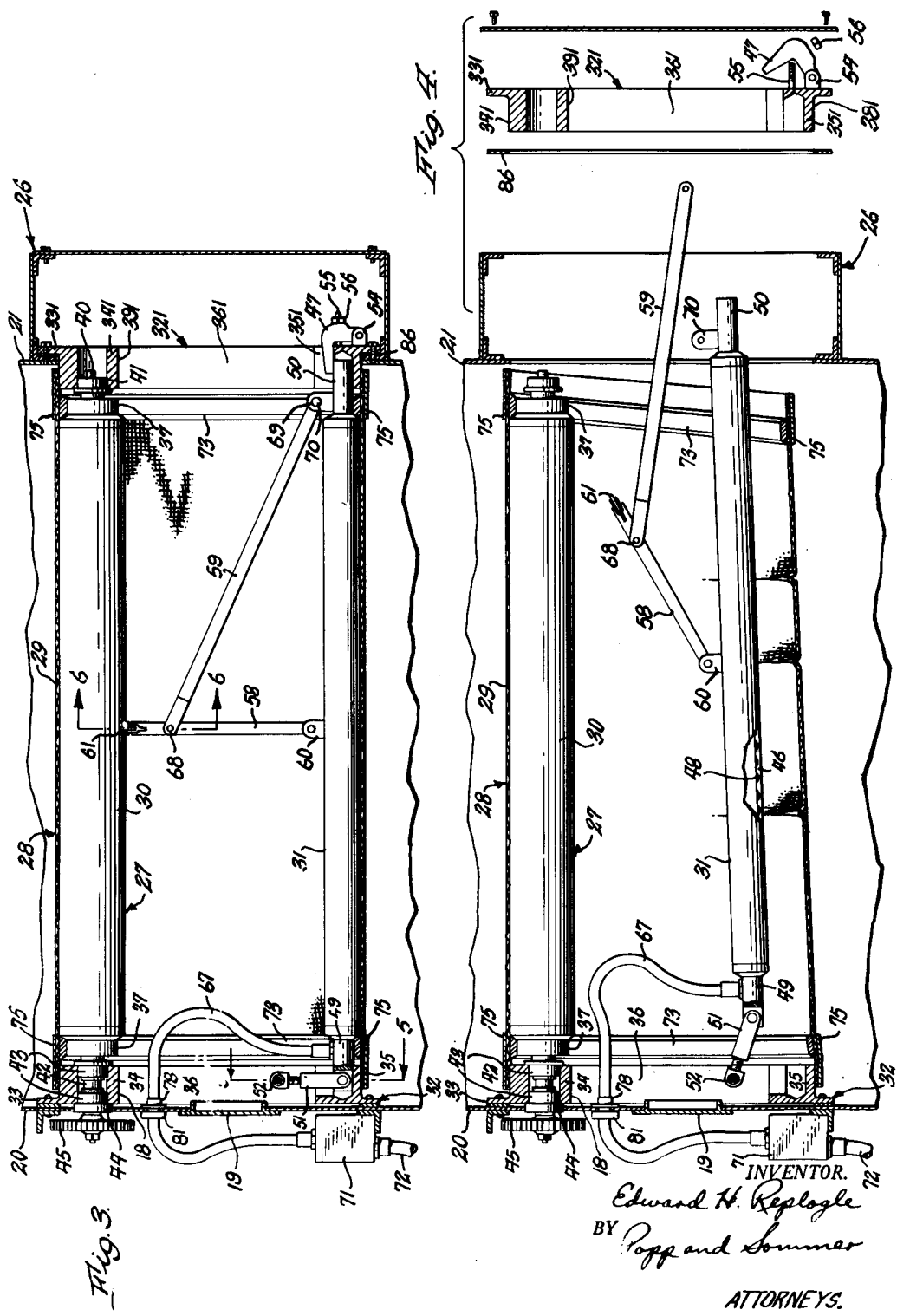

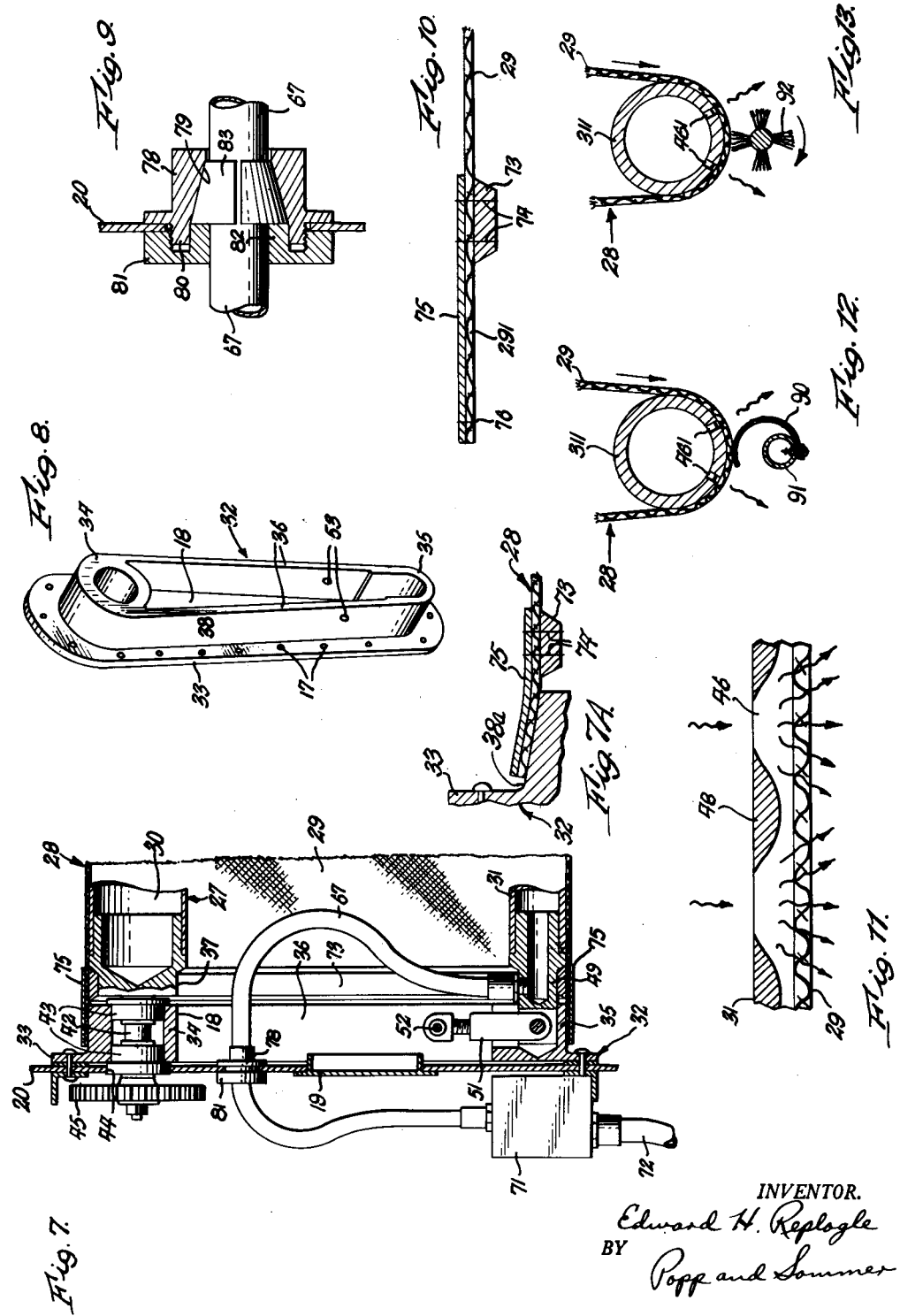

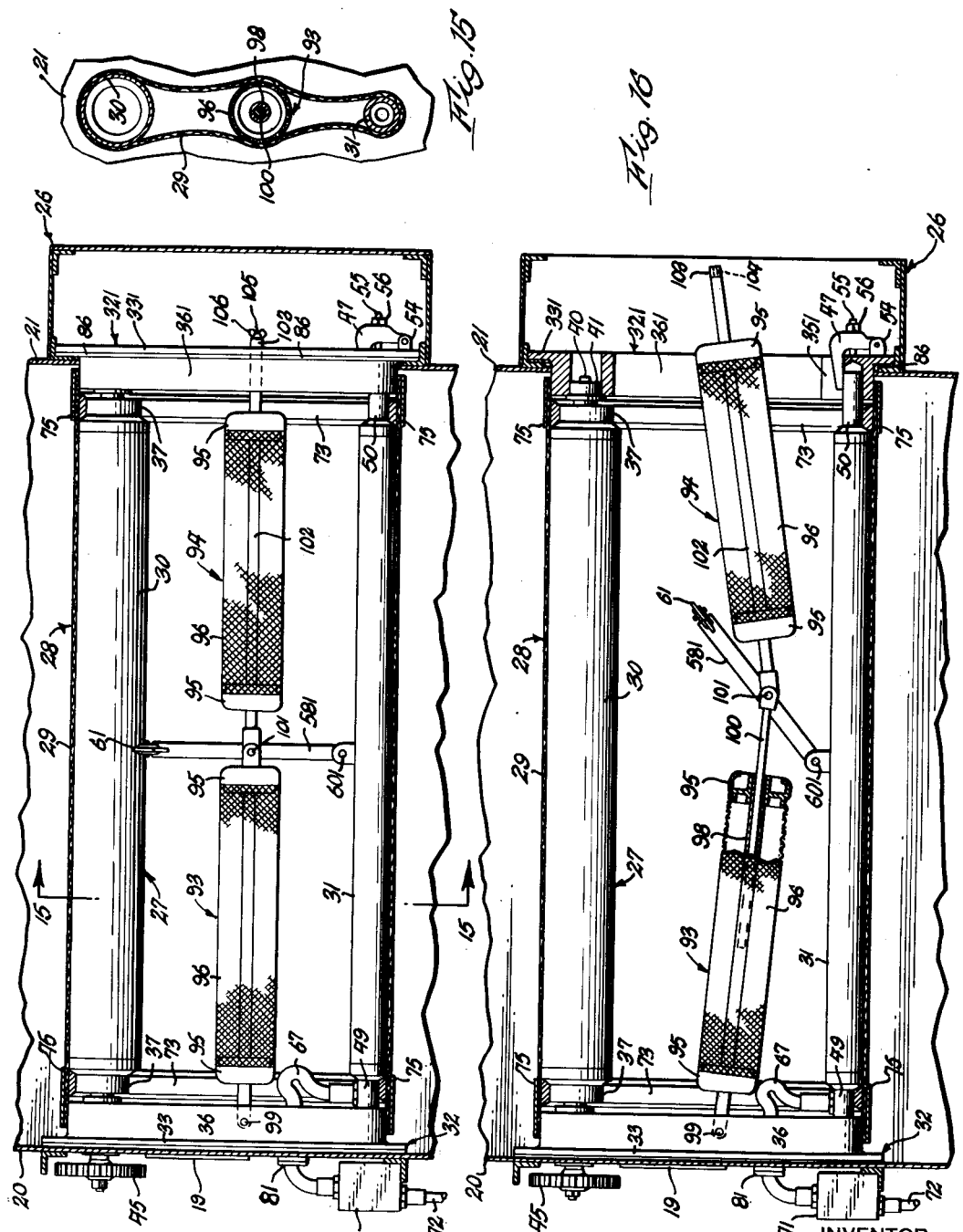

2,792,907

DUST COLLECTOR

Edward H. Replogle, Eggertsville, N. Y.

Application May 6, 1955, Serial No. 506,410

13 Claims. (Cl. 183—61)

This invention relates to improvements in dust collectors, and more particularly to those of the type employing a moving endless foraminous filter.

The primary object of the present invention is to provide such a dust collector which is highly efficient in filtering out dust particles from a dust laden gas.

Another object is to provide such a dust collector in which the endless filter element is effectively cleaned.

Another object is to provide such a dust collector in which dust deposited on the filter element is removed therefrom under circumstances which afford a minimum of opportunity for the removed dust to redeposit on the filter.

A further object is to provide such a dust collector in which the filter element can be easily and quickly removed and replaced.

Another aim is to provide such a dust collector which is compact and relatively simple in construction and hence relatively inexpensive to manufacture, and also which is not likely to get out of order or require repairs.

Still other objects and advantages of the present invention will be apparent from the following description and accompanying drawings in which:

Fig. 1 is an elevational view of one end of a dust collector embodying the present invention.

Fig. 2 is a vertical transverse sectional view thereof.

Fig. 3 is a vertical longitudinal sectional view thereof, taken on line 3—3, Fig. 1, and showing the supports for one of the filter elements in an operative position.

Fig. 4 is a view similar to Fig. 3 but showing the support structure adjusted preparatory to removing the filter element.

Fig. 5 is a fragmentary enlarged transverse sectional view through the support for one end of the blow tube and taken on line 5—5 Fig. 3.

Fig. 6 is a fragmentary enlarged transverse sectional view through the upper end of the strut for supporting the intermediate part of the drive roller and taken on line 6—6, Fig. 3.

Fig. 7 is a fragmentary view of the left-hand portion of Fig. 3 but on an enlarged scale.

Fig. 7A is an enlarged fragmentary vertical sectional view of the portion of the end bracket and filter element shown in Fig. 7 and illustrating the preferred sealing engagement therebetween.

Fig. 8 is a perspective view of the bracket which is provided at each end of each filter element.

Fig. 9 is a fragmentary enlarged vertical sectional view through the fitting on the end wall for sealing the air supply line leading to each blow tube.

Fig. 10 is a fragmentary enlarged cross sectional view through the marginal portion of the endless filter element.

Fig. 11 is a greatly enlarged fragmentary vertical longitudinal sectional view of a portion of the blow tube.

Fig. 12 is a fragmentary vertical transverse sectional view of a modified form of blow tube and showing an accessory scraping member.

Fig. 13 is a view similar to Fig. 12 but showing a rotatable brush substituted for the scraping member shown in Fig. 12.

Fig. 14 is a vertical longitudinal sectional view similar to Fig. 3 and showing means in an operative position for supporting the reaches of the endless filter element intermediate its upper and lower supports.

Fig. 15 is a vertical transverse sectional view, taken on line 15—15, Fig. 14.

Fig. 16 is a view similar to Fig. 14 but showing the intermediate support means in an operative position.

The dust collector embodying the present invention is shown as having a casing or housing including end walls 20, 21, side walls 22, 23, an inlet 24 at its upper end and a hopper 25 at its lower end. Referring to Figs. 3 and 4, the side wall 21 is shown as having suitably mounted on the exterior thereof an outwardly extending box-like casing 26 which forms an outlet chamber and has a removable panel.

Dust laden air is introduced into the inlet 24 and the dust particles entrained therein are filtered out and collected in the hopper 25, the cleaned or filtered air being discharged into the outlet chamber 26.

Arranged within the main casing or housing is one or more filter devices for effecting separation of the dust particles from the air. As shown in the drawings, four such filter devices are shown and each is designated generally by the numeral 28. Each such filter device 28 is identical to the others and therefore a detailed description of one is applicable to all. Each filter device 28 comprises an endless filter element 29. This filter element 29 may be felt, fabric, wire cloth or other suitable foraminous sheet material having interstices much smaller than its thickness and which permits the air to pass therethrough from one side to the opposite, but filters out particles carried by the entering air.

Each endless filter element is shown as arranged to pass over the top of an upper support 27. The upper support 27 is shown as being an elongated roller 30 journalled at its ends on the end walls 20 and 21. At each end of such roller 30 and mounted on the corresponding end wall 20 or 21, is a bracket. The bracket mounted on the end wall 20 is designated by the numeral 32 and is best illustrated in Fig. 8. The other bracket is designated by the numeral 321. Referring to Fig. 8, the bracket 32 has an outwardly projecting attaching flange 33 provided with holes 17 adapted to receive rivets or other suitable fasteners for holding the bracket on the end wall 20. Projecting inwardly of the main casing from this attaching flange 33 is a hub portion 34 adjacent the upper end of the bracket, and a U-shaped socket portion 35 adjacent the lower end of the bracket. The upper ends of the U-shaped socket portion 35 are connected to the hub portion by laterally spaced flanges 36, 36. These flanges 36 are preferably formed integrally with the hub 34 and are so formed that the outer surfaces of these parts form a continuous uninterrupted surface 38 which has a curved top, a curved bottom and flat side surfaces which diverge upwardly and outwardly from the bottom to the top. The space between the two straight sides of the attaching flange 33 of the bracket 32 is open as indicated at 18. This opening 18 registers in whole or in part with an access opening provided in the end wall 20 and which is shown as being closed by a removable cover 19. Referring to Fig. 3, it will be noted that the attaching flange 33 of the bracket 32 is arranged on the inside of the end wall 20.

The other bracket 321 is substantially identical in construction with the bracket 32. Thus, it has an attaching flange 331, a hub portion 341 at its upper end, a U-shaped socket portion 351 at its lower end and side flanges 361, 361 with the outer surface thereof and of the upper portion of the hub 341 and the lower portion of the socket 351 providing a continuous uninterrupted external surface 381.

Referring to Fig. 3, it is to be noted that the attaching flange 331 of the bracket 321 is arranged on the outside of the corresponding end wall 21, a suitable opening being provided in this end wall to accommodate the inwardly projecting portions of this bracket.

Each end wall of the roller 30 has a reduced axial extension as indicated at 37. Projecting axially and centrally from one end of the roller 30 is a still further reduced axle portion 40 which is received in a bearing 41 arranged within the bore of the hub portion 341 of the bracket 321. At the other end of the roller, there is provided a similar but longer axle portion 42. This axle portion 42 is received in a pair of axially spaced bearings 43, 43 arranged in the bore of the hub portion 34 of the bracket 32. Outwardly of the outermost of these bearings 43, the axle portion 42 extends outwardly through a hole provided in the end wall 20 indicated at 44 to the exterior of the end wall 20. On the outer extremity of the axle portion 42 is fast a gear wheel 45.

Referring to Fig. 1, it will be seen that the four gear wheels 45 mesh with each other so that driving any one of the same, which may be accomplished in any suitable manner (not shown), effects a rotation of all four. If it is desired that all four gear wheels 45 be rotated in the same direction, this can be readily accomplished by interposing an idler gear between adjacent pairs of gear wheels 45. In this manner, the rollers 30 forming the upper support for the several filter elements 29 are driven and cause movement of these filter elements.

The lower support 31 for each filter element 29 is stationary and serves not only as a lower support for the corresponding filter element, but also as a blow tube to which air under pressure is supplied to be discharged downwardly through a slot 46 in the bottom of the tube 31. Such slot 46 extends longitudinally for the full length thereof and as best shown in Fig. 11 has a sinusoidal form along its length which breaks through into the interior of the tubular support 31 at longitudinally spaced intervals therealong. Such a slot can readily be formed in the tubular support 31 by a milling operation employing a cutter which is forced to travel in a sinusoidal path as it is moved longitudinally relative to the tube. This leaves a series of webs 48 which extend transversely of the slot 46 and provide a stronger structure than if the slot 46 were cut completely through the tube 31.

The end of the stationary lower support or blow tube 31 adjacent the bracket 32 is provided with an outwardly projecting axial neck 49 of reduced diameter as compared with the diameter of the tube 31. The neck 49 is received in the socket of the U-shaped portion 35 of the bracket 32. A similar axial neck extension 50 is provided at the opposite end of the blow tube 31 and this extension 50 is similarly received in the U-shaped recess in the socket portion 351 of the bracket 321.

Means are provided for holding the lower support or blow tube 31 with its axis parallel to the upper drive roller 30 so that the endless filter element can pass over these members. However, from time to time, it may be desirable to replace a filter element 29 and in order to permit of this being readily accomplished, it is desirable to arrange the lower support or blow tube 31 so that it may be moved upwardly toward the upper drive roller 30. This relieves tension on the filter element and permits the same to be removed from its supports.

For this purpose, the neck 49 is shown as being pivotally connected at its outer end to the lower end of an adjustable link 51, the upper end of which is pivotally mounted on a pivot pin 52 which extends horizontally and transversely of the side flanges 36 of the bracket 32. The ends of this pivot pin 52 are received in holes provided in the side flanges 36 as shown at 53 in Fig. 8. The axis of the pivotal connection between the lower end of the adjustable link 51 and the neck 49 is parallel with that of the pivot pin 52.

The neck extension 50 at the opposite end of the lower support or blow tube 31 cooperates with means for holding this neck extension at the bottom of the U-shaped recess of the socket portion 351 of the bracket 321. While such means may be variously provided, that shown includes a hook 47 pivotally mounted on ears 54 which project outwardly from the attaching flanges 331 of the bracket 321 adjacent the lower end thereof. Immediately above the ears 54 is a horizontally and outwardly projecting threaded stud 55 adapted to be received in a slot in the hook 47 and held in the position shown in Fig. 3 by a nut 56. When the hook 47 is in the operative position as shown in Fig. 3, the lower surface of its inwardly projecting free end is horizontal and rests on the top of the neck extension 50.

Means are provided for preventing the upper and lower supports 27 and 31, respectively, from sagging inwardly toward each other at their intermediate portions. As shown, such means include a vertical strut 58 and an angled brace 59. The lower end of the strut 58 has a pivotal connection to a pair of ears 60 upstanding on the top of the lower support or blow tube 31. The upper end of the strut 58 has an anti-friction engagement with the drive roller 30 and this strut also has an adjustable effective length.

While the means for accomplishing these features may be variously constructed, those shown in Fig. 6 are suitable and comprise a pair of rollers 61, each mounted on the outer end of the cross bar of a generally T-shaped slide 62. The vertical part or leg of the T-shaped slide 62 is arranged within the tubular upper end of the strut 58, the side walls of which have slots 63 in which outwardly extending ribs 64 on the slide 62 are arranged. Interengagement of the ribs 64 and slot 62 prevent relative rotation between the slide 62 and strut 58. The slide 62 has a vertically threaded hole in which a threaded stem 65 is arranged. The lower end of this stem 65 is shown as being unprovided with external threads and received in a cylindrical recess provided in the strut 58 and held against axial movement relative thereto by a transverse locking pin 66. This locking pin 66 extends tangentially into an annular groove provided in the lower end portion of the stem 65. The upper end of this stem is arranged at all times below the upper surface of the slide 62. The stem 65 preferably has a slot therein adapted to receive the blade of a screw driver (not shown) or other suitable adjusting tool for turning this stem. It will therefore be seen that when the stem 65 is turned, the slide 62 will move axially relative to the strut 58, so as to vary the effective length of this strut and thereby move the roller 61 either closer to or further away from the drive roller 30.

The upper end of the brace 59 has a suitable pivotal connection to the strut 58 adjacent its upper end, as indicated at 68, and the lower end of the brace 59 has a pivotal connection as indicated at 69 to the upstanding pair of ears 70 on the neck extension 50 adjacent its inner end. The pivotal connection 69 is provided by a removable pin. When this pin is removed, it will be seen that the linkage can assume the collapsed and inoperative position shown in Fig. 4.

Means are provided for introducing air under pressure to the interior of the lower support or blow tube 31. This may be accomplished in any suitable manner but as shown is accomplished by means which include air supply lines 67, one for each of the blow tubes 31. The air supply lines 67 are made of any suitable flexible material such as a hose. The inner end of each air supply line 67 is suitably connected to the neck 49 adjacent its inner end and between the link 51 and the full diameter of the blow tube 31. The outer end of each air supply line 67 is suitably connected to a manifold box 71. This box 71 is shown as being suitably arranged on the outside of the end wall 20 and is supplied with compressed air from any suitable source (not shown) by a main line 72.

The air supply lines 67 are sealed at the place where they pass through the end wall 20. While any suitable sealing means may be employed, that shown in detail in Fig. 9 comprises a gland member 78 provided with a conical internal seat 79 and an externally threaded neck 80. This neck 80 is shown as projecting through a hole in the end wall 20 and screwed onto this neck is a nut member 81 having a follower portion 82 adapted to engage the outer end face of a split conical gasket 83, the periphery of which engages the seat 79. The gasket 83 is in the form of a split ring which surrounds the line 70 and it will readily be seen that tightening the nut member 81 will cause this gasket to firmly embrace the hose or line 67.

The reduced ends 37 of the drive roller 30 as well as the necks 49 and 50 at opposite ends of the blow tube 31 are adapted to be traversed by a belt 73 provided at each end of the endless filter element 29 on the inner surface thereof. Such belt is shown as being of the V type and for this purpose, the outwardly facing shoulders at the ends of the enlarged portions of the upper and lower supports 27 and 31, respectively, are provided with similarly angled faces. The belts 73 are suitably attached as by stitching 74 illustrated in Fig. 10 to the endless filter element 29 a short distance inwardly of its end and on the inner side thereof. One the outer side of each filter element 29 is shown an endless reinforcing strip 75. The reinforcing strip 75 overlays that portion 291 of the filter element 29 which projects laterally outwardly beyond the belt 73 and is held to this element along its inner margin by the stitching 74 and along its outer margin by stitching 76. The reinforcing strip 75 may be of any suitable material such as leather or plastic and instead of being stitched to the filter element, it may be attached thereto in any other suitable manner.

Referring to Fig. 3, it will be seen that the outer marginal portion 291 at each end of the filter element 29 overlays the continuous uninterrupted external surface 38 on the end bracket 32 and the corresponding surface 381 on the other end bracket 321. Engagement between the marginal extensions 291 of the filter element and the surfaces 38 and 381 of the end brackets provides a closure for the interior of the endless filter element 29 which is tubular or sleeve-like in form, normally open at its opposite ends.

Because of the scale of the drawings, with the exception of Fig. 7A now to be discussed, the continuous uninterrupted external surfaces 38 and 381 of the end brackets are illustrated as being semi-cylindrical at their upper and lower ends with the planes of their intermediate flat sides extending longitudinally of the filter element supports. Due to tension in the filter sleeve and with excessive pressure on its outer surface as compared with its inner surface, the sleeve may tend to sag intermediate its ends so that it would contact the surfaces 38 and 381 adjacent the inner end of these surfaces leaving the marginal portions of the filter sleeve curled outwardly. This would provide a wedge-shaped opening into which dust particles could work and destroy the effectiveness of the intended seal. It is to be noted that there is no relatively lower pressure under the ends of the filter sleeve and once raised from the surfaces 38 and 381, the gas pressure is effective on opposite sides of the raised portion. To overcome this disadvantage, it is preferred to taper the surfaces 38 and 381 so that at all places along their respective perimeters, they taper or incline inwardly. This is best shown at 38a in Fig. 7A where a vertical sectional view of the upper portion of the end bracket 32 and its manner of engagement with the corresponding margin of the filter element 28, is illustrated. The advantage of such a design is to insure that the flap seal is effective over its full area or at least insure that the marginal extremity or outer edge of the filter element or sleeve engages this surface. Thus dust is excluded from the interior of the flap seal. Moreover, the generally conical taper on the surfaces 38 and 381 increases the peripheral lengths of the filter sleeve at its opposite extreme ends thereby insuring an increased tension in the sleeve at its edges and discouraging the formation of a false and undesirable seal of the type heretofore described. Inasmuch as the end brackets 32 and 321 are preferably cast members, the tapered surfaces 38 and 381 thereon respectively can be readily provided by providing an extreme draft.

Referring to Fig. 2, it will be seen that the drive rollers 30 of the various filter devices 28 are arranged horizontally and parallel to each other in spaced relation so as to provide relatively narrow passage therebetween as is indicated at 84. Because the blow tubes 31 of these filter devices are narrower in diameter than the drive rollers 30, the opposing sides or reaches of adjacent filter elements 29 of the filter devices 28 form a diverging passageway extending downwardly from the upper relatively narrow passageway 84, such passageway having its greatest width at the level of the axes of the blow tubes 31, as indicated at 85. It will also be noted that the air discharge slot 46 in each of the blow tubes 31 is at the bottom dead center portion of these tubes and that the blast of air discharged therethrough passes through the corresponding filter element as it is drawn over the stationary blow tube.

This arrangement has several advantages. One is that the filter element 29 is flexed its maximum amount as it passes over its blow tube and the dust particles deposited upon the exterior of the filter element are blown off at a place adjacent the widest portion of the passageway 85 where velocity of flow is at a minimum and immediately above the hopper 25. The progressively increasing width of the passageway between adjacent filter devices from the upper point 84 to the lower point 85 reduces the velocity of the air so that, relatively speaking, there is a minimum of disturbance at the location 85 and the dust particles blown off the filter element are more likely to gravitate into the hopper rather than be caught into fast moving air or eddy currents. It will also be noted that the air discharged by the blow tubes is at the lowest place on the filter element 29 and the blown off dust particles are unlikely to be redeposited upon the sides of the filter element between its upper and lower supports.

Dust laden air entering the inlet 24 divides into a number of streams which pass downwardly through the narrow passageways 84. The air passes through the sides of the filter elements 29 into the interior thereof and the dust particles are filtered out and collect on the exterior surface of these filter elements. Each filter element may be cleaned progressively by passing it over the blow tube 31. Normally, power and wear are reduced by operating the cleaning cycle only intermittently on the basis of a time cycle or by sensing a change of differential pressure drop through the filter element. The cleaned air entering the interiors of the filter elements escapes through the opening 391 in the corresponding end bracket 321 and thence into the outlet chamber 26, from whence they can be discharged directly into the atmosphere or conducted to any other suitable place, even for subsequent processing if desired.

From time to time, the separated dust particles collected in the hopper 25 can be withdrawn therefrom in any suitable manner and by means which form no part of the present invention and hence they are not illustrated.

While the series of filter devices are shown as arranged so that their drive rollers and lower blow tubes 31 are in vertical alignment with each other, such filter devices can be tiered in a horizontal or inclined arrangement for particular applications if desired.

It will also be noted that the pressure on the outside of the various filter elements 29 is greater than the pressure interiorly thereof. This balance of excess pressure is effectively utilized in accordance with the invention to assure intimate and sealing contact between the marginal ends of the filter elements and the continuous uninterrupted surfaces of the corresponding end brackets which they engage.

If it is desired to remove any filter element 29, this can be readily accomplished by removing the outer wall of the casing of the outlet chamber 26, removing the end bracket 321 and its gasket 86 after first removing the nut 56 so as to release the hook 47 and to permit it to disengage the neck extension 50 on the blow tube 31. Thereafter, the pin 69 holding the lower end of the brace 59 to the blow tube 31 can be pulled or removed which permits the brace 59 and strut 58 to be collapsed as shown in Fig. 4. Thereafter, the blow tube 31 can be swung to the right as viewed in Fig. 4 and because of its connection with the link 51, it will swing upwardly toward the drive roller 30 thereby swinging itself out of engagement with the filter element 29. An operator reaching in through the opening in the end wall 21 normally occupied by the end bracket 321 can grasp the filter element and pull it out through this opening.

A similar procedure, except in reverse order, can be followed for replacing the filter element. Any adjustment of the leading or entering end of the newly inserted filter element can be effected by removing the cover 19 from the end wall 20 and reaching in and manually adjusting the adjacent end of the filter element. The blow tube 31 is than swung downwardly, the brace 59 and strut 58 restored to operative position, the end bracket 321 replaced and the hook 47 restored to its operative position. The strut and brace structure 58, 59 is preferably employed for filter devices in which the filter element 29 is of considerable axial length. If such filter element is relatively short, it is not necessary to provide an intermediate support.

In addition to the flexing of the filter element 29 as it passes over its blow tube 31, it may be desired that the deposited dust particles be physically agitated or scraped from the filter element so as to remove a portion of such deposits or to loosen them in order to permit their more ready removal by the blast of air discharged from the blow tube. A satisfactory arrangement is shown in Fig. 12 in which a substantially semi-cylindrical piece of metal screening 90 is arranged opposite the lowermost end of the blow tube, here designated 311. The screening 90 can be supported in any suitable manner so that a free end portion thereof rides on the external surface of the filter 29 which passes over the blow tube 311. As shown, the lower end of the screening 90 is fastened by screws to a supporting rod 91 suitably mounted on the frame of the collector. In this embodiment, two slots through which compressed air is discharged are shown as arranged, one on each side of the line of contact between the curved screening or scraper 90 and the filter element 29. The slots are designated in Fig. 12 as 461. It will be noted that the curl or curve of the screening or scraper 90 with respect to the direction of movement of the filter element 29 is such that this scraper can be pushed away from the filter element and will not dig into the same. The scraper or screening 90 extends for the full length of the blow tube 311 as do also the slots 461 each of which may be similar to the slot 46 previously described.

Instead of employing a piece of flexible wire screening as a scraper, a rotary brush can be employed. Such a brush is shown at 92 in Fig. 13. This brush may be stationary or revolved by contact with and driven by the filter element, or may be separately driven in any suitable manner so as to rotate in either a direction opposed to the movement of the filter element or in the same direction.

The modified form of dust collector shown in Figs. 14–16 incorporates means for supporting the endless filter element intermediate its upper and lower supports. Such intermediate support may be desirable where the filter element is made of a material which offers little resistance to stretch or creep over long periods of time, such as felt. With such a weak filter material, the excess pressure on the outside of the filter sleeve will tend to cause a catenary action of the two reaches of the filter element between its upper and lower supports and to such an extent that the inner opposing faces of the filter element will contact each other.

This result is avoided by the intermediate support means shown in Figs. 14–16. Such means are shown as comprising a pair of rollers 93 and 94 arranged coaxially when in an operative position and on opposite sides of the vertical strut 581, as shown in Fig. 14. Each of the rollers 93 and 94 is shown as having a pair of end heads 95, 95 on which a perforated tube or cylindrical shell 96 is suitably arranged. Preferably, such shell is a sleeve of wire screening suitably mounted on its opposite ends on its end heads 95. The end heads 95 for the support roller 93 are shown as being suitably mounted on a bearing sleeve 98. One end of this bearing sleeve is shown as extending outwardly through the adjacent end head 95 and is formed at its outer end to receive a transverse pivot pin 99 which is suitably mounted on the side flanges 36 of the end bracket 32. Slidably arranged within the bearing sleeve 98 is a rod 100. The outer end of this rod is suitably pivotally connected to the strut 581 intermediate its ends, as indicated at 101.

The end heads 95 for the other intermediate support roller 94 are suitably rotatably mounted on an axle rod 102 which projects outwardly from opposite ends of this roller. The inner end of the axle rod 102 is suitably pivotally connected at 101 to the strut 581. The outer end of the axle rod 102 has a horizontal cross bar 103 so as to form a T-shaped head at this end of the axle rod. Each arm of the cross bar 103 has a horizontal hole 104 extending therethrough in a direction axially of the roller 94. When the intermediate support rollers 93 and 94 are in the operative position as shown in Fig. 14, the holes 104 severally receive threaded studs 105 which project horizontally outwardly from the end bracket 321. The cross bar 103 is held against the outer face of the end bracket 321 by a wing nut 106 arranged on the outer end of each of the threaded struts 105.

To accommodate the mounting of the support rollers 93 and 94, the air supply line 67 is shown in Figs. 14 and 15 as passing through the end wall 20 of the collector at a lower elevation than is shown in the preceding figures of the drawings. Inasmuch as the rollers 93 and 94 serve as braces for holding the strut 581 in an upright position, the brace 59 shown in the preceding figures of the drawings is eliminated in the form of the invention shown in Figs. 14–16.

When it is desired to change a filter element 29, the wing nuts 106 are removed and the roller 94 is pulled to the right as viewed in Fig. 16. This will swing the strut 581 in a clockwise direction as viewed in Fig. 16 about the pivotal mounting 601 at its lower end. Lateral shifting of the roller 94 will partially pull the rod 100 from the bearing sleeve 98 for the roller 93, as shown in Fig. 14. With the intermediate support means in the position shown in Fig. 16, the lower support or blow tube 31 can be released in the same manner as previously described for the other forms of the invention in order to permit removal or replacement of the filter element 29. After a new filter element has been mounted, the procedure for restoring the intermediate support means from the inoperative position shown in Fig. 14 to the operative position shown in Fig. 14 is just the reverse of that previously described.

Referring to Fig. 15, it will be seen that the disposition of the intermediate support rollers permits the filter element 29 to assume a double catenary condition as depicted in Fig. 15. Such an arrangement not only disposes of slack in the filter element 29, but also decreases tension therein.

Further, it is obvious that as the filter element 29 is moved over its upper and lower supports, engagement of this element with the intermediate support rollers 93 and 94, will serve to rotate these rollers since they have a free mounting on their respective axles. By the arrangement shown in Figs. 14–16, it will also be seen that each intermediate roller 93 and 94 is supported at its opposite ends so that the structure is quite sturdy.

From the foregoing, it will be seen that the present invention provides a dust collector of the type employing a movable, endless foraminous filter element which possesses many advantages over collectors of this general type heretofore constructed. The dust collector of the present invention is compact in size, the filter element has a very substantial amount of flexing at the cleaning point, and there is little chance for redeposition of the dust because of the orientation of the cleaning point with respect to the filter element. Further, the filter element has no wrinkles with consequent reduced cleaning air loss. Still further, the cleaning point is at a location of least air circulation and permitting direct gravitation of the removed deposited dust toward the hopper. Moreover, with the present invention, the cleaning tube can be relatively inexpensively manufactured since there are no internal surfaces which come in contact with the filter element and, therefore, internal surfaces are not required to be hand polished. Further, the blow tube of the present invention is easily slotted for its full effective length.

While the embodiments of the invention illustrated employ two or more filter element supports having their axes lying in a common plane, it is within the present teaching to arrange the filter element so as to have a triangular configuration or otherwise, as long as one of such basic supports is a fixed longitudinally ported blow tube extending the length of the filter element and so contoured externally as to force the element to bend around it to an appreciable extent whereby the interstices of the element are caused to elongate on the side on which the filtered out dust particles deposit. This facilitates air blasting off the deposit. Further disposing the air blast cleaning port on the blow tube where the filter element is compelled to make such a sharp bend, the force of the cleaning air jet is reacted by the inherent tension in the filter element.

Many arrangements and designs of specific parts different from those illustrated in the drawings, will be readily apparent to those skilled in the art within the teaching herein disclosed and, therefore, the arrangements illustrated are intended to be illustrative rather than limitative and the invention is to be measured only by the scope of the appended claims.

I claim:

1. In a dust collector, the combination comprising a drive roller, a stationary blow tube arranged in spaced and parallel relation to said drive roller and having a curved external surface and a movable endless filter sleeve passing around said roller and tube and engaging therewith, said blow tube having a port extending the length of said sleeve and covered thereby and arranged in said curved surface and adapted to discharge a pressurized gas through said filter sleeve as it is flexed in passing over said curved surface.

2. In a dust collector, a housing having an inlet for dust laden gas and an outlet for filtered gas, at least one movable endless filter sleeve arranged within said housing so that its entire exterior surface is in communication with said inlet and its interior is in communication with said outlet, a driving support, a second support, said supports being ararnged in spaced relation within said sleeve and supporting the same, and means providing a continuous uninterrupted surface projecting into each end of said sleeve and slidably engaged by the marginal portions thereof along their entire lengths.

3. In a dust collector, a housing having an inlet for dust laden gas and an outlet for filtered gas, at least one movable endless filter sleeve arranged within said housing so that its entire exterior surface is in communication with said inlet and its interior is in communication with said outlet, a bracket mounted on said housing and arranged at each end of said sleeve and having a continuous uninterrupted surface projecting into the corresponding end of said sleeve and slidably engaged by the marginal portion thereof along its entire length, a drive roller arranged within said sleeve and engaging the same and journalled at its opposite ends on said brackets, and a stationary support arranged within said sleeve remote from said roller and engaging said sleeve and mounted at its opposite ends on said brackets.

4. The combination as set forth in claim 3 in which said drive roller and stationary support have a recessed periphery at each end thereof adjacent said surfaces and said filter sleeve has a belt on its inner surface adjacent each end thereof and received in said recessed peripheries.

5. The combination as set forth in claim 3 in which said drive roller and stationary support have a recessed periphery at each end thereof adjacent said surfaces and said filter sleeve has a belt on its inner surface adjacent each end thereof and received in said recessed peripheries and said filter has a reinforcing strip on the outer surface thereof at each end thereof and extending along the full length of its margin.

6. In a dust collector, a housing having an inlet for dust laden gas at its upper end, an outlet for filtered gas at the side thereof and a hopper at its lower end, a plurality of movable endless filter sleeves arranged in spaced relation within said housing so that the entire outer surface of each sleeve is in communication with said inlet and the interior of each sleeve is in communication with said outlet, means arranged internally of each of said sleeves for supporting the same in a vertically elongated direction so that each sleeve has spaced downwardly convergent sides, said sleeves being arranged in side by side fashion to provide downwardly diverging passageways between the opposing sides of adjacent sleeves and means arranged to discharge a pressurized gas through each of said sleeves toward said hopper as the sleeve traverses the bottom of its course for cleaning the sleeve of dust deposited on the outer surface thereof.

7. In a dust collector, a housing having an inlet for dust laden gas and an outlet for filtered gas, at least one movable endless filter sleeve arranged within said housing so that its entire exterior surface is in communication with said inlet and its interior is in communication with said outlet, a bracket mounted on said housing at one end of said sleeve, a second bracket at the other end of said sleeve removably mounted on said housing and surrounding said outlet, each of said brackets having a continuous uninterrupted surface projecting into the corresponding end of said sleeve and slidably engaged by the marginal portion thereof along its entire length, a drive roller arranged within said sleeve and engaging the same and being journalled at one end for cantilevered support on said first bracket and at its opposite end being removably journalled on said second bracket, and a stationary support arranged within said sleeve remote from said roller and engaging said sleeve and mounted at one end on said first bracket and at its opposite end removably on said second bracket.

8. The combination as set forth in claim 7 in which said stationary support is arranged to be moved toward said drive roller so as to release said sleeve.

9. The combination as set forth in claim 7 in which said one end of said stationary support is connected to said first bracket by a link and said opposite end of said stationary support is releasably connected to said second bracket so as to permit said stationary support to be moved toward said drive roller in order to release said sleeve.

10. In a dust collector, a housing having an inlet for dust laden gas and an outlet for filtered gas, at least one movable endless filter sleeve arranged within said housing so that its entire exterior surface is in communication with said inlet and its interior is in communication with said outlet, a bracket mounted on said housing at one end of said sleeve, a second bracket at the other end of said sleeve removably mounted on said housing and surrounding said outlet, each of said brackets having a continuous uninterrupted surface projecting into the corresponding end of said sleeve and slidably engaged by the marginal portion thereof along its entire length, a drive roller arranged within said sleeve and engaging the same and being journalled at one end for cantilevered support on said first bracket and at its opposite end being removably journalled on said second bracket, a stationary support arranged within said sleeve remote from said roller and engaging said sleeve and mounted at one end on said first bracket and at its opposite end removably on said second bracket, and brace means operatively interposed between said drive roller and stationary support intermediate the ends thereof to prevent sag of the same.

11. In a dust collector, the combination comprising a stationary blow tube having a curved surface and circumferentially spaced ports adapted to discharge blasts of pressurized gas, an endless filter element movably engageable with said curved surface, and a scraping device arranged to engage the surface of said filter element between said ports and arranged on the side of said filter element opposite from said ports.

12. In a dust collector, the combination comprising spaced supports, a movable endless filter sleeve arranged on said supports and having spaced reaches extending therebetween, a strut operatively arranged between said supports intermediate the ends thereof to prevent sag of the same, and intermediate filter support means arranged between said supports including a foraminous roller on opposite sides of said strut and connected thereto, one of said rollers being movable generally axially of the other to permit said strut to be moved to an inoperative position.

13. In a dust collector, the combination comprising a movable endless filter element including a flexible sheet material having interstices much smaller than its thickness, means for supplying dust laden gases to the exterior of said filter element at a pressure greater than on the inner surfaces thereof, and a fixed longitudinally ported tube extending the length of said filter element and so arranged as to act as an internal support for said filter element and so contoured externally as to force said filter element to bend around it and cause the interstices of said filter element to elongate on the outer side thereof, and the porting in said tube being arranged to discharge a pressurized gas through said filter element while the interstices thereof are in the aforementioned elongated condition.

References Cited in the file of this patent

UNITED STATES PATENTS

| | | |
|---|---|---|
| 1,949,002 | Annis | Feb. 27, 1934 |
| 2,689,020 | Hersey | Sept. 14, 1954 |

FOREIGN PATENTS

| | | |
|---|---|---|
| 271,134 | Italy | Jan. 30, 1930 |
| 290,286 | Switzerland | Aug. 1, 1953 |
| 772,047 | France | Aug. 6, 1934 |
| 855,651 | Germany | Nov. 13, 1952 |